Oct. 23, 1962   A. BERTOZZI   3,060,034
PROCESS FOR PRESERVING CRUSTLESS PIECES OF PARMESAN CHEESE
Filed Aug. 17, 1959   4 Sheets-Sheet 1

Oct. 23, 1962     A. BERTOZZI     3,060,034
PROCESS FOR PRESERVING CRUSTLESS PIECES OF PARMESAN CHEESE
Filed Aug. 17, 1959     4 Sheets-Sheet 2
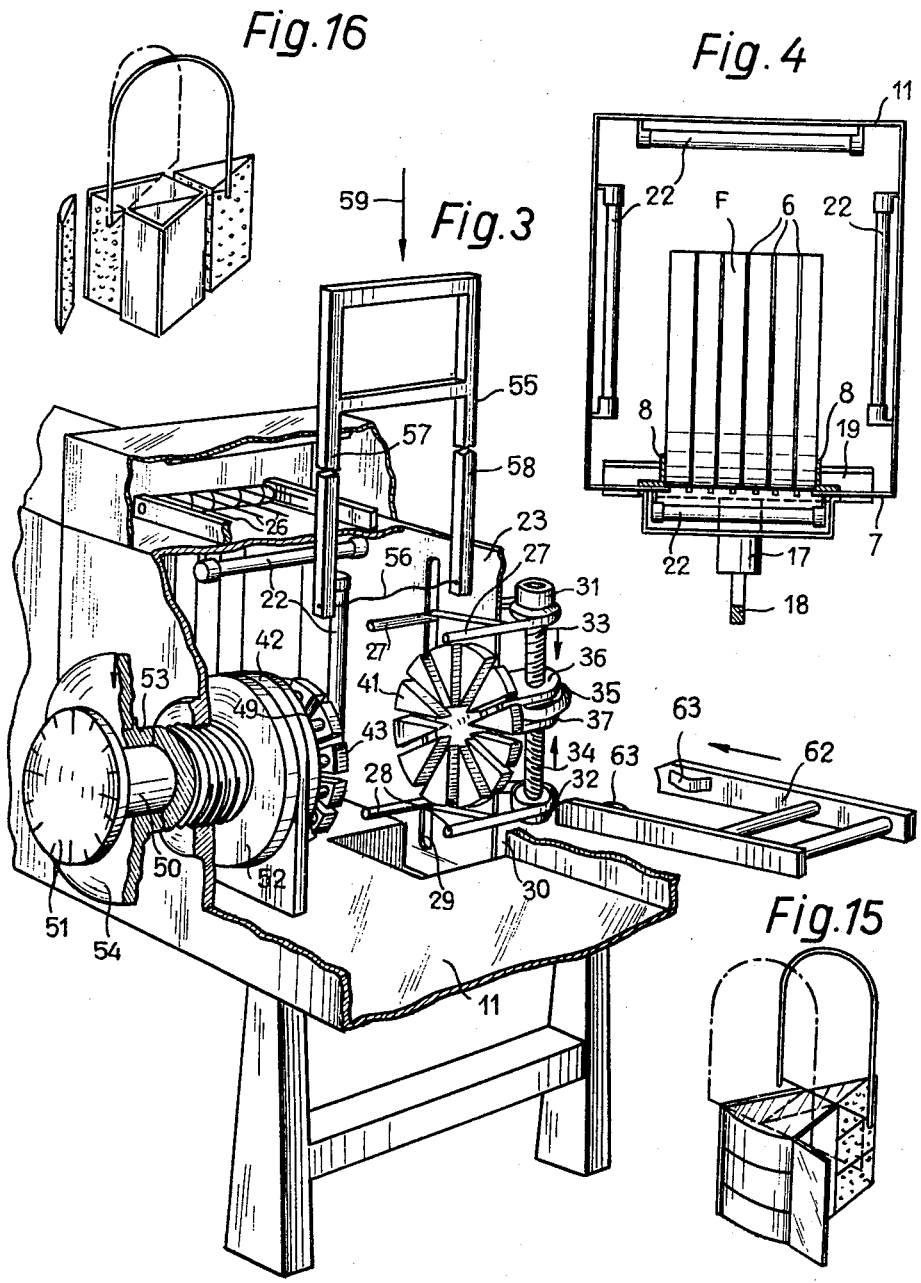

Oct. 23, 1962　　　　　A. BERTOZZI　　　　　3,060,034
PROCESS FOR PRESERVING CRUSTLESS PIECES OF PARMESAN CHEESE
Filed Aug. 17, 1959　　　　　　　　　　　　　　　4 Sheets-Sheet 3
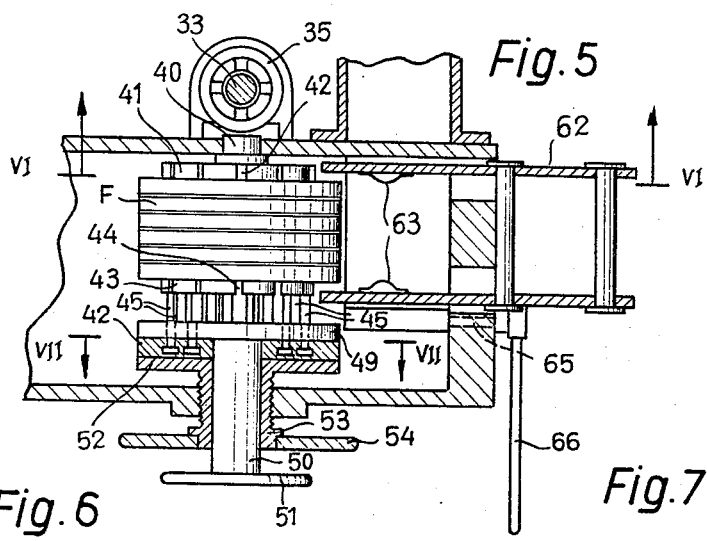
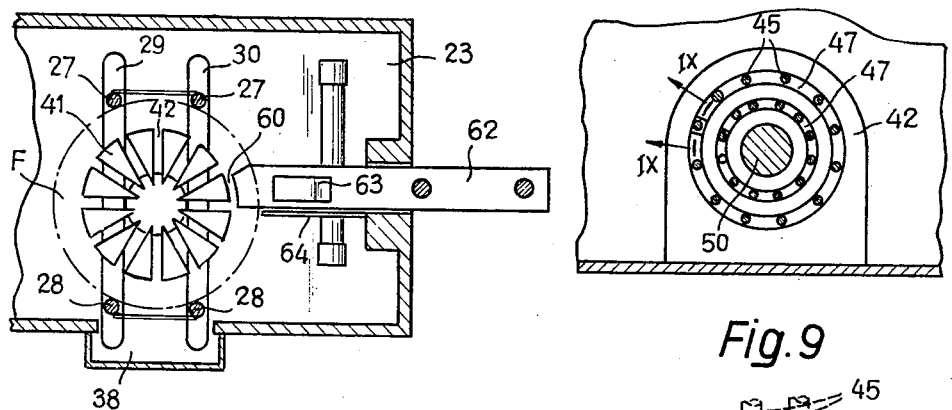
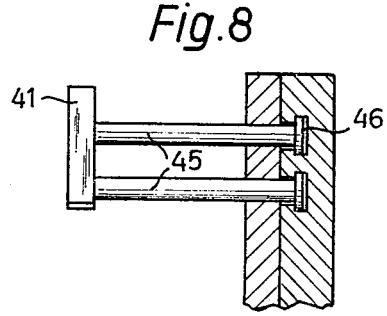
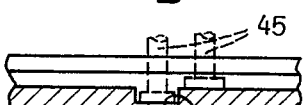

Oct. 23, 1962  A. BERTOZZI  3,060,034
PROCESS FOR PRESERVING CRUSTLESS PIECES OF PARMESAN CHEESE
Filed Aug. 17, 1959  4 Sheets-Sheet 4
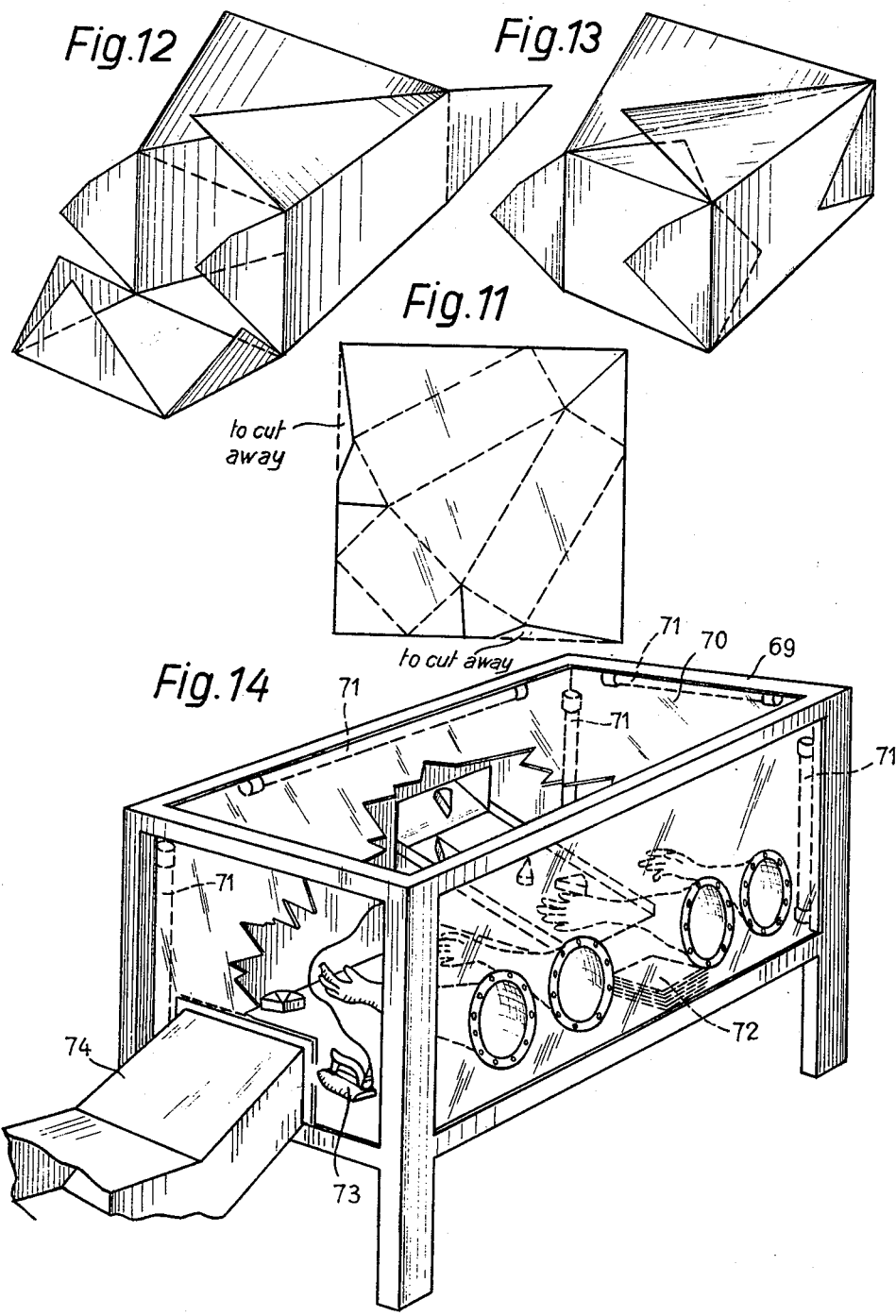

3,060,034
PROCESS FOR PRESERVING CRUSTLESS PIECES
OF PARMESAN CHEESE
Aldo Bertozzi, Parma, Italy, assignor to Societa per
Azioni Abele Bertozzi, Parma, Italy
Filed Aug. 17, 1959, Ser. No. 834,194
Claims priority, application Italy June 20, 1952
3 Claims. (Cl. 99—162)

This invention is a continuation-in-part of my application Ser. No. 352,652, filed May 4, 1953, and now abandoned.

Hard or semi-hard cheese, such as Parmesan cheese, produced from milk at a suitable temperature by the coagulating action of rennet and enzymatic activity of selected bacteria inoculated on coagulation resisting the relatively high temperature at which cheese is manufactured, that is, 50° to 55° C. which is fatal to any other microbic species, comprise (a) the crust or bark, (b) the edible paste.

(A) The crust or bark, which is not present on cheese as the cheese cake is produced, originates following internal biochemical reactions and spontaneous evaporation, when the cheese cake after treatment in a sole bath, is stored for conditioning in storage rooms kept at a suitable temperature and moisture content. The cheese undergoes therein enzymatic and biochemical transformations known as ageing or ripening, specifical of each cheese kind, the extent and type of which are essential for the final success of cheese manufacture.

The crust or bark gradually and considerably increases in thickness till it reaches, after an ageing period of two, three or more years, a thickness of several millimeters up to nearly two centimeters. The crust which coats the cheese paste without any discontinuity, becomes harder as it increases in thickness and, although its nutritive properties are fairly good, it is not generally considered edible, above all because it radically differs in flavor and taste from the cheese paste proper.

Similarly to fruit peel, the cheese crust of bark chiefly protects the underlying paste, for it prevents contamination of the paste by foreign microbic forms which would cause it to get mouldy or become stale.

In order to further the efficiency of this protective function, a coating composed of linseed oil admixed with earth and carbon black is applied to the bark, the black coloring preventing objectionable rise and fall in temperature which would injuriously affect the ordinary ageing process. The crust reaches in aged cheese about 20 to 25% by weight of the cheese cake, according to the crust thickness.

(B) The edible paste, representing about 75 to 80% by weight of the cheese cake, is a food known from ancient times which, on account of its high content of proteins, aminoacids and fats is superior to meat in nutritious power. Moreover, its peculiar property which distinguishes it from any other food, resides in supplying to the organism a selected enzymatic charge essential to the normal human digesting functions.

A number of enzymatic and biochemical transformations due above all to selected bacteria contained in the seed or "graft" introduced on coagulation and surviving the high cheese manufacturing temperature, take place in the cheese paste.

The *Bacillus acidi lactici, Bacillus acidophilus, Bacillus bulgaricum* and further bacilli have been identified among the abovementioned bacteria, which find in cheese paste their natural nutritious substrate furthering their symbiotic activity which results in the typical flavor and savor of aged cheese. In the distinction between living and dead food, depending upon whether they are supplied to the human organism in their natural state or after having undergone more or less radical treatment tending to arrest any decay or alteration phenomenon therein, cheese should be ranged among the small number of living food substances together, for instance, with fresh fruit. It certainly is the only living food possessing a high energetic and plastic charge.

On account of its structure and considerable size of the cakes placed on the market, which reach a weight up to 70 kgs. and more, the hard or semi-hard cheese is considered an auxiliary seasoning rather than a food. As a food, it should be consumed within a very short time after the cake has been cut, for once the crust has been removed and the paste is no longer protected thereby, it undergoes by the bacteric charge in air or atmospheric agents (temperature and moisture) an actual aggression which radically affects its composition and properties. The spores and micelia of *Aspergillus niger, Penicillium glaucum, Bacillus butirricus* etc. that had been eliminated by high temperature in the preparation of cheese, are no longer hindered in settling on the exposed paste and effecting the transformations known as mildew and staling, which lead to disagreeable taste and smell and inhibit use of the cheese.

Moreover, the temperature and moisture bring about on the exposed portion, no longer protected by the crust, transformations, such as drying, oxidation, imbibition, which alter at first at the surface and gradually through the cheese depth the peculiar agreeable organoleptic characters of the cheese just cut.

This explains the various attempts made to avoid the above mentioned drawbacks and preserve during use such a valuable living food in fragments meeting the requirements of individuals or communities. Melted cheese resulted as a step of this trend but, while it has been successful in making available to the public a portion of cheese possessing a high energetic plastic charge in adequate quantity for use by individuals or groups of individuals, still possessing agreeable organoleptic properties, without crust therefore fully edible, it has not solved, on account of the fact that it is pateurised, the other aspect of the problem, that is, preserving unaltered, in small fragments of a large cheese cake, the high enzymatic charge which is the other valuable property of cheese, as mentioned above.

Among hard and semi-hard cheese Parmesan cheese is outstanding. This cheese, which is better known in Italy and abroad by the name of "grana parmigiano," which is nutritious and palatable. It is rich in antirachytic, antixerophtalmic and antineuritic vitamins. 93% approximately of its dry substance is assimilable. One kilogram of Parmesan cheese is equivalent to 3,930 calories (one kilogram of boneless beef meat is equivalent to 1,510 calories, one kilogram of eggs or 20 eggs is equivalent to 1,500 calories).

Parmesan cheese is a food appealing to all classes of individuals on any occasion. It can be served in a grated condition as a seasoning for soups and other dishes, or as a table or dessert cheese without requiring any preparation in the kitchen. Its proteinic substances are almost wholly digestible without leaving any products noxious to metabolism in the organism.

Parmesan cheese reaches full ripening and develops its inherent peculiar properties which make it fit for use only after two years' conditioning, its properties even further improving during the third year. Heretofore the purchaser distinguishes its standard to date as follows:

(1) Striking blows by a suitable hammer having a slightly curved head, held by the thumb and first finger on all the cheese wheel faces. The sound should be full and uniform throughout and such as to detect compactness of the paste.

Prolonged training and a sensitive ear are necessary in order to distinguish differences in sound and derive a judgment therefrom.

Faults are more easily ascertained with larger wheels of an average weight exceeding 35 kgs., more especially at their middle region, but are much more difficult to ascertain in middle-sized cheese wheels.

On the other hand middle-size cheese (average weight 30 kgs.) is more acceptable to the great majority of restaurants or similar establishments and retail traders, big wheels lasting too long, for the cheese once cut and exposed to air on the counter dries, cracks, takes a "calcined" appearance and is altered in color, which displeases the consuming public;

(2) *Piercing.*—In order to ascertain the fragrance, taste, buttery condition of the paste, flavor and state of ripening, needle tests are carried out. A typical needle is employed, which is made of steel, about 15 cm. long, about 1.5 mm. in diameter, with a helically-shaped surface. Such needle once introduced into the paste and removed therefrom carries along in its small recesses a small portion of the cheese paste.

This test also requires a long training and highly sensitive smelling in order to distinguish odours and derive a correct judgment.

(3) *Splitting.*—In addition to striking blows and piercing described above experts split a number of cheese wheels out of a lot for further evaluation of the state and standard of cheese. In this case also the overall testing of a cheese lot cannot embrace all the wheels in the lot. Splitting has been referred to because Parmesan cheese can merely be split by conventional cutting means in use.

In order to split the wheels by means of a suitable olive-shaped knife having a convex body ending by a point, a diametrical marking line is drawn throughout the wheel surface for subdivision into two equal halves, whereupon the knife is sunk and owing to its structure acts like a wedge down a few centimeters along the marking line the knife being drawn twice, whereupon two such knives are sunk into the furrow and, after a few seconds, both knives are slowly forced apart to subdivide the wheel into two halves.

The same process is necessarily adopted by retail sellers in order to obtain from wheel halves smaller fragments for distribution to the purchasers.

The surface of the cheese paste at the slit is of a granular and foliated character, instead of being plain and smooth.

Judgment from the above described tests is a subjective one for it relies upon sensorial organs (ear, smelling, palate). It is therefore variable with subjects, frequently even variable with the same subject.

Since faults which may occur in cheese paste are of a wide variety and number, such as flavor faults (pungent ewe-cheese), acid, Greek hay), crust faults (deforming corrections), risers, hollows (circumscribed cavities due to localized development of gas, the adjacent paste being highly lenticular and moist at times, etc.), full guarantee would necessitate splitting all the wheels in the lot, which would be absurd in trade considering that preservation and outer crust hardness imply continuity of the crust.

Breach of the crust exposes the paste to air, which results in drying, cracks, alterations in aspect, attack by mildew (Penicilli and Aspergilli), Acarus (*Acarus siro* typical of cheese), flies (*Piophila casei* L, likewise typical of cheese), Coleopters (*Tenebri mauritanicus* L), dust, etc.

Obviously, anyone purchasing cheese in a shop receives an irregular fragment with crumbs, obtained from a wheel which has at times been exposed to air for several days, on which contamination has started, though not perceivable by the eye, and will progress at the purchaser's unless it is readily consumed.

An object of this invention is to provide a method of preserving hard or semi-hard cheese, especially Parmesan cheese in crustless fragments of a predetermined size, which maintain the characteristic properties of the just cut cheese as results from conventional splitting of cheese wheels having a crust.

A further object of this invention is to provide a method of forming crustless fragments from a wheel of hard or semi-hard cheese, especially Parmesan cheese and subsequently protecting said fragments for preservation for an indefinite period, which can be carried out on an industrial scale.

By the improved method the cheese wheels having a crust, of an irregular cylindrical form are taken after an adequate conditioning period of not less than one year, cleaned, deprived of their crust, subdivided to polyhedral fragments of a regular form having smooth surfaces of the desired size, the fragments are confined within adherent protective wrappers, subsequently sterilized together with their wrappers by submitting them from the outside to the action of a source of heat for the purpose of sealing the surfaces of the cheese fragment, causing the wrapper to thoroughly adhere to the fragment surfaces and simultaneously driving off any air residue between the protective wrapper and fragment surfaces.

The method can be carried out in two manners, namely, either part in an aseptic or a non-aseptic but hygienically satisfactory environment, respectively.

Both embodiments of the improved method, namely the procedure prevailingly in an aseptic and in a non-aseptic environment, respectively, comprise the preparatory step of removing the crust from the cheese wheel on the lathe. Of course turning is effected to remove the crust only throughout its thickness avoiding any waste of valuable paste which would necessarily arise by cutting by conventional methods. This operation is carried out in the non-aseptic but hygienically satisfactory environment. According to the first embodiment, the cheese wheel deprived of its crust turned to a cylindrical shape is subsequently conveyed through a conduit having a sterilizing action through admission of bactericide gases, such as formaldehyde or ozone into the conduit, whence it is brought to an environment of an aseptic nature afforded by the action of ultraviolet rays.

The cheese cylinder treated as above is subdivided into fragments of a predetermined shape and weight by means of strong wire, the surface of the resulting fragments being almost perfectly smooth, free from discontinuities, any cheese waste being avoided. The cutting wire is made sterile by the same means as employed for sterilizing the environment.

The last step of the method is likewise carried out in an aseptic environment and consists in packaging the cheese fragments by means of protective sheets which are caused to adhere to the cheese surfaces by the action of heat, in order to avoid leaving any air pocket between the cheese and protective wrapper, the resulting protection replacing the natural function of the previously removed crust under all aspects, namely preventing any contamination from the outside and any decay due to oxidation (staling).

Alternatively all the above described operations are carried out in a non-aseptic but hygienically satisfactory environment, preservation of the packaged fragment being obtained through simultaneous sterilization of the fragment and its wrapper by employing a source of heat which raises the surface temperature to not less than 80° during 10 seconds, care being taken that a further rise in temperature necessitates a gradual reduction of the period of treatment.

The two embodiments of the improved preserving method shall now be described with reference to the accompanying drawings which show by way of example the apparatus employed for carrying out the method. On the drawings:

FIGURE 3 is a part sectional perspective view of a constructional detail of the plant shown in FIGS. 1 and 2;

FIGURE 4 is a sectional view on lines IV—IV of FIG. 1;

FIGURE 5 is a sectional view on line V—V of FIG. 1;

FIGURE 6 is a sectional view on line VI—VI of FIG. 5;

FIGURE 7 is a sectional view on line VII—VII of FIG. 5;

FIGURE 8 is a part sectional side view of a constructional detail of the structure shown in FIG. 5;

FIGURE 9 is a sectional view on line IX—IX of FIG. 7;

FIGURES 10 to 13 show the wrapper adapted to form the protective package of the crustless cheese fragments;

FIGURE 14 is a perspective part view of the plant shown in FIGS. 1 and 2;

FIGURES 15 and 16 are perspective views of auxiliary appliances and manner of using them in carrying out the improved method.

Figure 1:
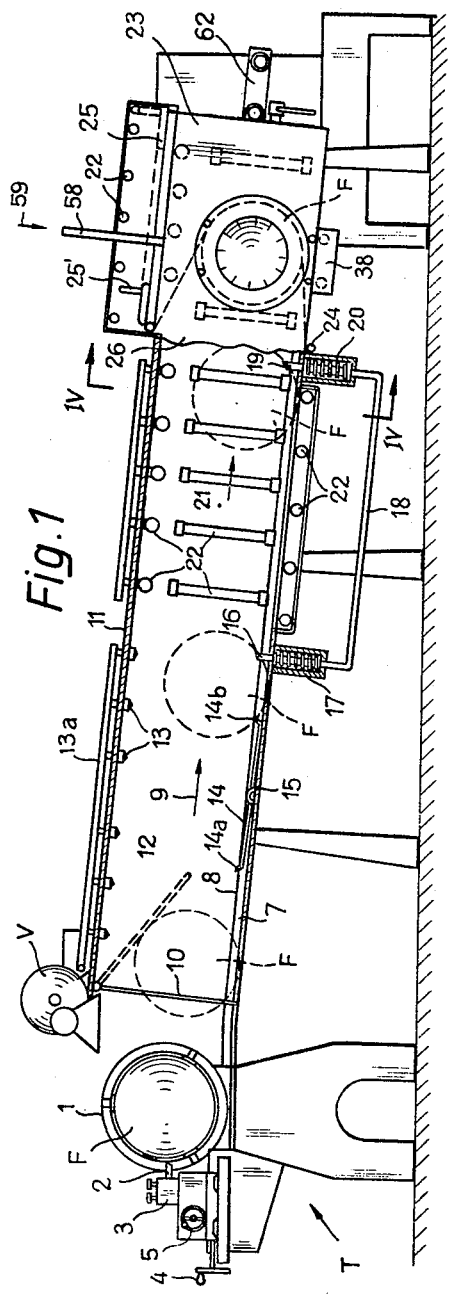
FIGURE 1 is a part sectional side view of a plant for carrying out the first embodiment of the method.

On the drawings T (FIGS. 1 and 2) diagrammatically shows a lathe, having a self-centering chuck 1 which supports a Parmesan cheese wheel F, a cutting tool 2 being supported by a revolver 3 adapted to be displaced in an axial and radial direction to the axis of the chuck 1 by acting on hand-wheels 4 and 5.

The cheese wheel F can range in weight between 24 kgs. and 70 kgs., its average weight being 30–35 kgs., its diameter 35 to 45 cm. and its height 18 to 24 cm.

Figure 2:
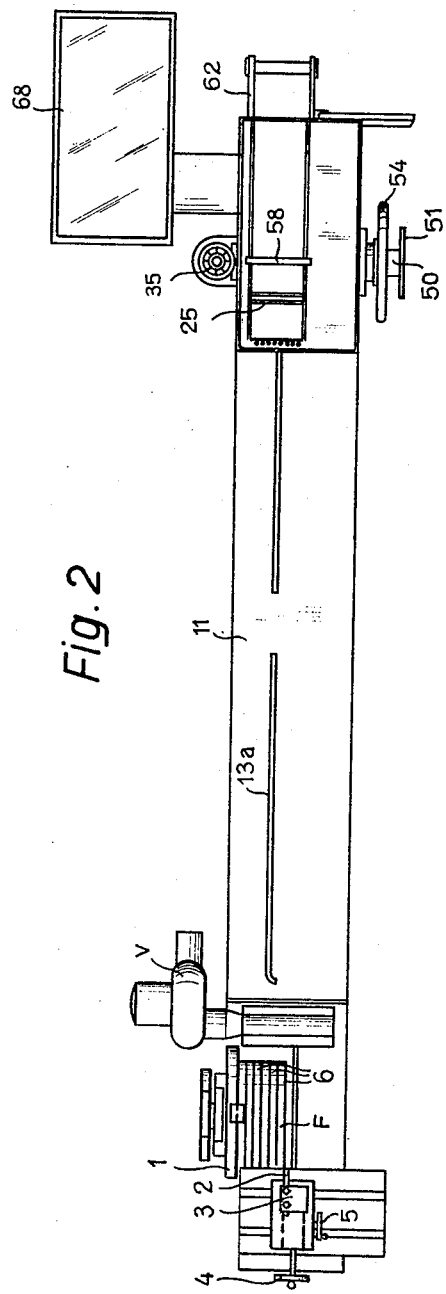
FIGURE 2 is a plan view of the plant shown in FIG. 1.

During turning the cheese wheel its crust, which is about 6 mm. in thickness, is first removed from the slightly convex base surfaces, next from the cylindrical skirt. Shallow equidistant grooves 6 are thereafter cut in the cylindrical skirt of the wheel F again by turning (FIG. 2).

The wheel brought to a cylindrical shape is placed on an incline 7 along which it is guided by lateral guides 8 and rolls in the direction of the arrow 9 (FIG. 1) opening a swinging door 10 which closes the inlet to a tunnel 11. The tunnel is ideally subdivided into two sections, namely, a first section 12 in which the cheese wheel admitted thereto is subjected to the action of bactericide gases, such as formaldehyde or ozone which flow into the tunnel through nozzles 13 depending from the ceiling fed by a valve-controlled conduit 13a, the valve not being shown.

Gas escaping from the tunnel on admission of the wheel is exhausted by a fan V. The sterilizing gas is not continuously delivered, delivery being controlled by the position of a beam 14 fulcrumed at 15 to the bottom wall of the tunnel 11.

On entering the tunnel the cheese wheel depressed at a given moment an end 14a of the beam 14 against the action of a spring (not shown), thereby closing an electric contact (not shown) actuating a valve adjusting delivery of gas through conduit 13a to the nozzles 13.

On further travel in the direction of the arrow 9 the wheel F acts upon the end 14b of the beam 14 restoring it to its initial position, thereby opening the contact and closing the valve interposed in the conduit 13a which supplies gas to the nozzles 13.

The cheese wheel is arrested at the end of the tunnel section 12 by a stop 16 extending from the tunnel bottom wall biased by a spring 17. The stop 16 is connected by a longitudinal bar 18 to a further similar stop 19 biased by a spring 20. The stop 19 is arranged at the end of the section 21 of the tunnel in which the cheese wheels are subjected to the action of ultraviolet rays from lamps 22 arranged to irradiate the wheel surfaces throughout (FIG. 4). The tunnel size is selected so that the spacing of the lamps and surface of the cheese does not exceed 30 cm.

Sterilizing by means of ultraviolet rays is carried out during 10 minutes, whereafter the bar 18 is lowered by displacing stops 16—19 against the action of springs 17 and 20, thereby allowing the cheese wheel to go over from section 12 to section 21 and from the latter to a chamber 23, respectively, in which the cheese wheel is cut to fragments, ultraviolet lamps being likewise arranged therein for sterilizing the environment.

The cheese wheel leaving the tunnel section 21 abuts a number of piano steel wires anchored at one end to a cross member 24 arranged beneath the bottom of the tunnel 11 and at their other end to a slide 25 movable on suitable guides arranged on the ceiling of the tunnel section 23. A hood C overlies the guides and houses further ultraviolet ray lamps which sterilizes the piano steel wire section outside the chamber 23.

The slide 25 is normally located as shown in broken lines in FIG. 1, when the wires extend perpendicular to the bottom and ceiling of the tunnel and occupy therein the position denoted by 26.

On lowering of the stop 19 the cheese wheel comes into contact with the wires at 26, which are similarly spaced as the grooves cut in the skirt of the cheese wheel. On further travel of the cheese wheel the wires are stretched, the slide being moved from its position 25 to its position 25'.

As the slide reaches the latter position the cheese wheel F is at the level of two arm pairs 27, 28 (FIG. 3) reaching within the tunnel through slots 29, 30 cut in one side wall thereof defined by members 31, 32 in which co-axial tapped holes are formed. The holes have screw sections 33, 34, respectively, screwed thereinto, which are adapted to be actuated by rotating a handwheel 35 supported between two perforated brackets 36, 37 secured to the tunnel side walls.

The screws 33, 34 are oppositely inclined, whereby rotation of the hand-wheel moves the arms 27 and 28 in opposite directions. The moment the cheese reaches the position shown in FIG. 1, the arms shall be so located that the lower arm pair are retracted within a lower recess 38 in the tunnel floor. On subsequently acting on the hand-wheel 35 the arm pairs 27, 28 are drawn together and embrace the cheese wheel skirt centering the wheel in a predetermined position. At this stage the cheese wheel is clamped between two lateral clamps, the structure of which is described hereafter.

The tunnel side near the handwheel 35 is bored to rotatably accommodate a pivot 40 (FIG. 5) carrying a plurality of circular sectors 41 spaced by radial clearances 42.

The number of sectors is such that the radial clearances form diametrical grooves in the face of the clamp formed by the sectors.

On the opposite side similar sectors 43 are arranged spaced by grooves 44. The sectors each carry two stems 45 (FIG. 8), ending by enlarged portions or bulges 46 slidable in concentrical annular guides 47 formed in a plate 48 (FIG. 7) clamped between a disc 49 having holes bored therein for the stems 45 on the sectors 43 and secured to a shaft 50 which can be rotated by a handwheel 51 (FIG. 5). The size of the sectors 41 and 43 is selected so that the cheese wheel F clamped between them radially extends beyond their periphery by a certain extent for purposes to be explained thereafter.

On the other side of the plate 48 a disc 52 is securely fixed to a tapped sleeve 53 surrounding the pivot 50 rotatable from a hand-wheel 54.

Means (not shown) which may comprise rotatable rods and gears are provided for causing the sector sets 43, 44 to intermittently rotate in full synchronism for the grooves 42 to be constantly aligned with the grooves 44 and for two pairs at least of grooves to be perpendicular to the bottom and ceiling of the tunnel after each given angular movement of the hand-wheel 51. The annular guides 47 cut in the plate 48 are sunk at a given position to cause the bulges 46 on the stems 45 on each sector 43 in a given angular position to retract, as explained hereafter.

Clamping of the cheese wheel between the lateral clamps carrying the sectors 41 and 43 is effected by rotating the handwheel 54 which by screwing into a corresponding screw-threaded seat in the side wall of the tunnel 11, moves the disc 52 inwardly of the tunnel, thereby pushing the plate 48 which is incapable of rotating. The plate 48 in turn pushes a perforated disc 49 and sectors 43 against a lateral surface of the cheese wheel which is pressed against sectors 41. Once the cheese is clamped, the wheel is cut into discs by displacing the slide 25 having anchored thereto the piano steel wires 26 from its position shown at 25, FIG. 1 in broken lines to the position shown at 25'. The wires travel through the cheese wheel and resume their initial position, the cylindrical cheese wheel being thereby subdivided into discs which are, however, still clamped between sector sets 41, 43. Cutting of the discs to segments is effected by introducing through suitable guides formed in the ceiling of chamber 23 a cutting apparatus 55, the wire 56 of which (FIG. 3) acts as a cutter. Arms 57, 58 of the cutting apparatus are of a thickness such as to enter the aligned grooves 42, 44 arranged perpendicular to the bottom of the chamber 23. After each movement of the cutting apparatus 55 in the direction of the arrow 59 (FIG. 3), the former is lifted, the cheese wheel clamped between the two side clamps is rotated by acting on the hand-wheel 51 through an angle such as to bring the other grooves 42, 44 to a position perpendicular to the bottom of the chamber 23.

In order to effect the required rotation of the hand-wheel 51 reference indicia or snap devices (not shown) can be provided for "feeling" the successive cutting positions on the cheese wheel.

As a set of wedges to which the cheese wheel has been cut reach their position denoted by 60, FIG. 6, the associated sector 43 releases its pressure against the cheese, for the bulges 46 on its stem 45 have abutted recesses 61 (FIG. 9) cut in the bottom of the annular grooves 47 in the plate. 48. The set of cut wedges are, however, gripped in this position by pincers 62 fitted into the tunnel from the outside, to prevent a disorderly fall of the wedges. The pincers are equipped on the inside of their arms with leaf springs 63 which catch the portion of the cheese wedges extending beyond the outline of the sectors 41, 43. However, the pincers can be hand-actuated in order to safely grip the pile of cheese wedges in the position 60. By withdrawing the pincers 62 from the casing, the cheese wedges caught by the pincers are released. The wedges are deposited on a rocking table 64 which is connected by a pin 65 to a lever 66 arranged externally of the tunnel. By lifting the lever 66 the table 64 is inclined, the cheese wedges being moved to a chute 67 of stainless steel sloping enough to cause the cheese wedges to fall along the chute to a chamber 68 in which they are individually packaged by protective wrappers and heat treated to effect ultimate sterilization and sealing of the package. Alternatively, the chute can be vibrated by electromagnetic vibrators.

The chamber 68 is shown in FIG. 14 and comprises a frame 69 and glass walls 70 through which the operations which are being carried out in its inside can be inspected. The inside of the chamber 68 is maintained in a sterile condition through the action of U.V.-rays emanating from lamps 71. In the embodiment shown the cheese wedges are packaged by hand by the worker outside the chamber 70 by means of previously prepared wrappers 72 which are introduced into the chamber and sterilized by the action of the ultraviolet rays. The packaged wedges are heat treated by passing a heating means 73 substantially similar to a flat iron over each face of the packaged cheese wedge, which is subsequently conveyed to an outlet 74 from the chamber 70. It is understood that packaging of the wedges and subsequent heat treatment are actually carried out in practice on an automatic machine. The latter has not preferably been illustrated since it is outside the scope of this invention as well as for the sake of clearness.

When it is desired to reduce the segments to a smaller size than obtainable on the plant just described, this can be effected by hand by means of tools shown in FIGS. 15 and 16, the structure and use of which will be obvious to the man of the art without any further detailed description.

Where the plant described above is employed for carrying out the embodiment of the process in a non-aseptic environment, the tunnel 11 and sterile chamber 70 become superfluous, for all operations can be carried out in a non-aseptic environment, provided it is hygienically satisfactory, sterilization and sealing of the packages being effected through the action of heat on the surfaces of the packaged cheese wedge.

However, the latter procedure is advisable only when the packaged cheese wedges should not be preserved very long, for it does not guarantee thorough removal of any spore or possible source of deterioration of the cheese paste in the package.

Where the packaged cheese should be indefinitely preserved and made suitable more especially for shipment overseas and preservation under any climate, the first embodiment should preferably be adopted.

FIG. 11 shows a metal or plastics sheet and folding lines therefor, suitable for packaging wedge-shaped cheese fragments in accordance with the improved process. FIGS. 12 and 13 show the intermediate steps of the packaging of a cheese portion, FIG. 10 showing the finished package.

What I claim is:
1. A process for preserving crustless pieces of Parmesan hard cheese, comprising the steps of
    (1) cleaning and removing the crust from an irregularly cylindrical Parmesan cheese wheel after the latter has been submitted to a suitable conditioning for a period of not less than one year;
    (2) subdividing the Parmesan cheese wheel into polyhedral pieces of regular shape having smooth surfaces and of desired size by means of resilient tensioned surfaces of limited surface area;
    (3) packaging the Parmesan cheese pieces thus obtained in protective wrappers adhering to the surfaces of Parmesan cheese pieces;
    (4) heat treating the packaged Parmesan cheese pieces to destroy surface vegetative cells of said cheese pieces and the wrappers therefor, thereby causing the later to adhere to the Parmesan cheese piece surfaces and driving off any air residue between the wrapper and the cheese piece surfaces.

2. A method of preserving crustless pieces of Parmesan cheese, comprising the steps of
    (1) removing the crust throughout the crust thickness while avoiding any waste of valuable Parmesan cheese paste to form a cylinder;
    (2) causing the crustless Parmesan cheese paste cylinder to travel through a chamber containing bactericide gases, and treating said cylinder for ten minutes in an environment which is rendered aseptic by the action of ultraviolet rays the source of which is spaced from the Parmesan cheese by at most 30 cm.;
    (3) subdividing the Parmesan cheese paste cylinder into portions of a predetermined shape and weight by means of resilient tensioned surfaces of limited surface area to form smooth-surfaced Parmesan cheese pieces free from discontinuities without waste of material, the resilient cutting means being sterilized by the means employed for rendering the environment aseptic;
    (4) packaging by means of a protective sheet which is caused to adhere to the Parmesan cheese by the action of heat to avoid any air pockets, to cause the wrapper to replace under all aspects the previously removed crust, thereby preventing any contamination from the outside or deterioration due to oxidation, said packaging and heat treatment being effected in an aseptic environment.

3. A method as defined in claim 1 in which the steps are carried out in an ordinary non-aseptic environment, preservation of the packaged Parmesan cheese portion being obtained by simultaneous destruction of surface vegetative cells of each Parmesan cheese piece and its wrapper by employing a source of heat which raises the surface temperature of the cheese piece to not less than 80° C. during 10 seconds, care being taken to shorten the period on further rise in temperature.

References Cited in the file of this patent

UNITED STATES PATENTS

| | | |
|---|---|---|
| 2,077,300 | Abrams et al. | Apr. 13, 1937 |
| 2,364,049 | Bensel | Dec. 5, 1944 |
| 2,461,981 | Hills | Feb. 15, 1949 |
| 2,684,905 | Grindrod | July 27, 1954 |